L. W. LUELLEN AND E. G. WESSMAN
MACHINE FOR MAKING PAPER CUPS.
APPLICATION FILED MAR. 20, 1917.

1,365,517.

Patented Jan. 11, 1921.
8 SHEETS—SHEET 1.

FIG.1.

Lawrence W. Luellen
and Edwin G. Wessman, INVENTORS
BY
ATTORNEY

L. W. LUELLEN AND E. G. WESSMAN
MACHINE FOR MAKING PAPER CUPS.
APPLICATION FILED MAR. 20, 1917.

1,365,517.

Patented Jan. 11, 1921.

Lawrence W. Luellen INVENTORS
and Edwin G. Wessman
BY Clifford E. Dunn
ATTORNEY

L. W. LUELLEN AND E. G. WESSMAN.
MACHINE FOR MAKING PAPER CUPS.
APPLICATION FILED MAR. 20, 1917.

1,365,517.

Patented Jan. 11, 1921.
8 SHEETS—SHEET 3.

Lawrence W. Luellen
and Edwin G. Wessman, INVENTORS
BY Clifford F. Dunn
ATTORNEY L. W. LUELLEN AND E. G. WESSMAN
MACHINE FOR MAKING PAPER CUPS.
APPLICATION FILED MAR. 20, 1917.

1,365,517.

Patented Jan. 11, 1921.

Lawrence W. Luellen
and Edwin G. Wessman, INVENTORS
BY [signature]
ATTORNEY

L. W. LUELLEN AND E. G. WESSMAN
MACHINE FOR MAKING PAPER CUPS.
APPLICATION FILED MAR. 20, 1917.

1,365,517.

Patented Jan. 11, 1921.
8 SHEETS—SHEET 7.

Lawrence W. Luellen INVENTORS
and Edwin G. Wessman,
BY Clifford E. Dunn
ATTORNEY L. W. LUELLEN AND E. G. WESSMAN.
MACHINE FOR MAKING PAPER CUPS.
APPLICATION FILED MAR. 20, 1917.

1,365,517.

Patented Jan. 11, 1921.
8 SHEETS—SHEET 8.

FIG.11
FIG.10
FIG.15
FIG.9

Lawrence W. Luellen
and Edwin G. Wessman,
BY
ATTORNEY

INVENTORS

UNITED STATES PATENT OFFICE.

LAWRENCE W. LUELLEN, OF MOUNTAIN LAKES, AND EDWIN G. WESSMAN, OF PASSAIC, NEW JERSEY, ASSIGNORS TO INDIVIDUAL DRINKING CUP COMPANY, INCORPORATED, OF NEW YORK, N. Y., A CORPORATION OF NEW YORK.

MACHINE FOR MAKING PAPER CUPS.

1,365,517.  Specification of Letters Patent.  Patented Jan. 11, 1921.

Application filed March 20, 1917. Serial No. 156,004.

*To all whom it may concern:*

Be it known that we, LAWRENCE W. LUELLEN and EDWIN G. WESSMAN, citizens of the United States, residing at Mountain Lakes, in the county of Morris and State of New Jersey, and at Passaic, in the county of Passaic and State of New Jersey, respectively, have invented certain new and useful Improvements in Machines for Making Paper Cups, of which the following is a specification, reference being had to the accompanying sheets of drawings, in which we have illustrated one form of an automatic machine in which the principles of our invention may be embodied.

Our present invention relates to machines for making paper receptacles and the object of the invention is to provide a mechanism which is to accomplish this result in a cheap, efficient and continuous manner.

One embodiment of our invention, which we have chosen to illustrate exemplifying the principles of our invention, is a cup making machine producing what is known in the art, as "sanitary paper drinking cups."

In this machine a conveyer is provided for receiving partly-formed cups; more specifically, paper blanks in the form of open-ended truncated cones, this conveyer operating in a step-by-step fashion to present the cups in sequential order to a paste-applying mechanism, which applies paste to the bottom-receiving ends thereof and a transfer mechanism which transfers them to dies on a rotating turret die carrier which have previously been supplied with suitable paper disks which form the bottoms of the cups. The turret die carrier, being supplied with the parts which form the cup, presents the same to the action of a forming head which forms an inwardly and upwardly directed bottom supporting shoulder and simultaneously therewith an automatically rolled-over edge or lip at the open or drinking end of the cup.

Means are also provided for discharging the completely formed cups from the machine by compressed air into a receptacle which, when filled, forms and constitutes an original package.

The several instrumentalities employed for performing these operations are arranged to produce completed cups in a continuous manner.

Figure 1:
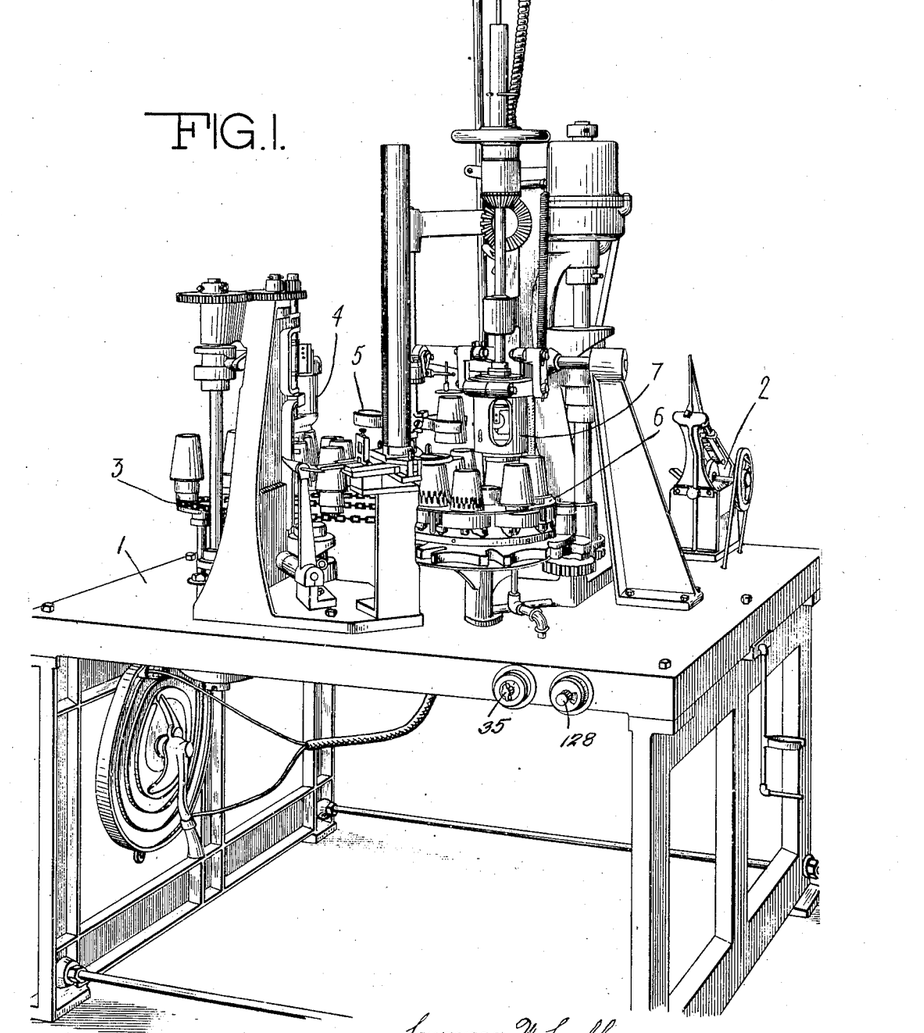
In Figure 1 we illustrate in perspective one form of cup-making machine embodying our invention.
Figures 2, 12:
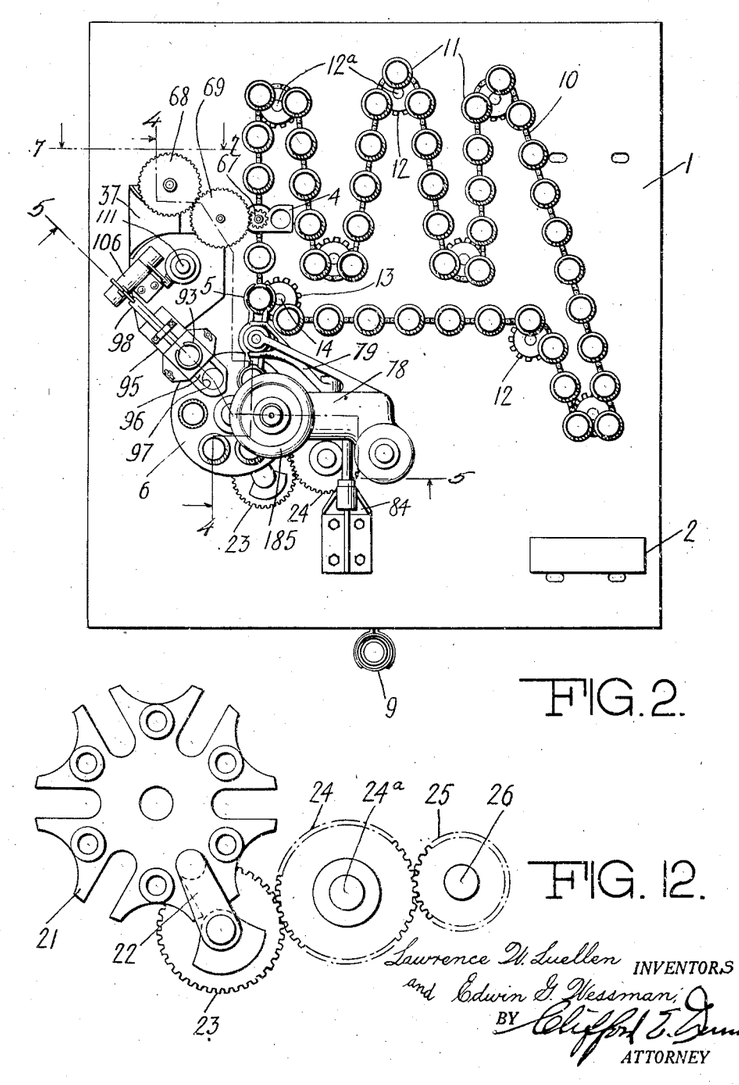
Fig. 2 is a top plan view thereof showing the relation of the parts of the mechanism which are above the table or support.
Fig. 12 is a diagrammatic illustration of the Geneva motion mechanism employed for imparting step-by-step movement to the turret die carrier.

More specifically describing the cup-making machine 1 indicates a table beneath and upon which the mechanism is supported. As already indicated, the partly-formed cups received by the machine are formed from blanks of paper with their edges suitably joined together by paste or otherwise into frusto-conical form. This initial forming and pasting operation may be effected by any suitable means, as, for instance, by a former, indicated at 2 in Fig. 1. The partly-formed cups are then placed upon a traveling conveyer indicated at 3, which conveys them to a bottom paste-applying mechanism 4, illustrated in enlarged detail in Figs. 7 and 8, this latter mechanism operating to apply paste to that interior portion of the partly-formed cup where the paper bottom disk is to be permanently positioned. The partly-formed cup is then moved toward a transfer mechanism indicated at 5, which transfers it to one of the forming dies carried by the turret 6, upon which a bottom has previously been deposited. This turret moves in a step-by-step manner properly timed with relation to the movement of the transfer mechanism 5. The partly-formed cup with the bottom disk in place upon the turret die is moved to a position to be acted upon by the reciprocating forming head 7, which simultaneously forms an inwardly and downwardly extending leg portion to support the bottom of the cup, and a rolled-over-edge or lip at the open or drinking end of the cup. Upon the completion of this forming operation, the turret carries the completely-formed cup into a position where it is discharged therefrom by compressed air through a tube 8 (see Fig. 4) into a suitable receptacle 9 (Fig. 2). It will be understood from this that the step-by-step movement of the conveyer mechanism and the die-carrying turret are in synchronism as are also the transfer mechanism and the reciprocating forming head. The mechanism, by means of which these movements are imparted to these several instrumentalities will be hereafter more fully and particularly described.

*The cup-conveying mechanism.*

Figures 3, 13:
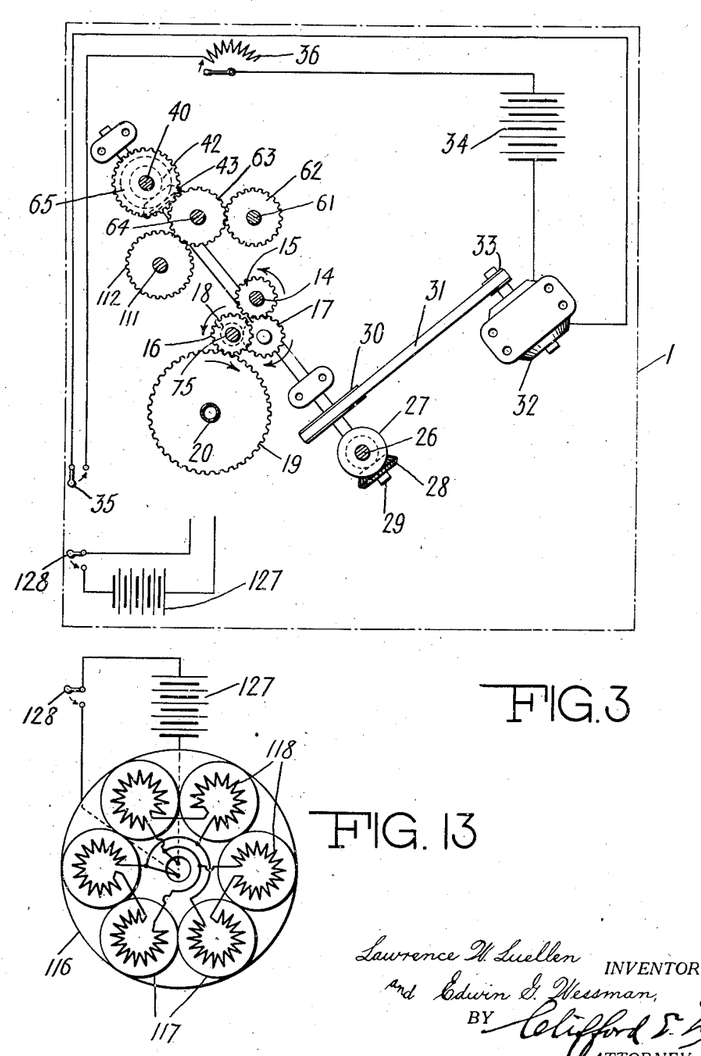
Fig. 3 is a top plan view of the driving mechanism as viewed upon the removal of the top or support and the mechanism thereabove.
Fig. 13 is a diagrammatic view of a portion of the turret showing the heating means employed for heating the cup dies.

The conveyer for carrying the partly-formed cups to the bottom paste-applying mechanism and from this to the transfer mechanism, which transfers them to the flange forming dies, may be of any suitable construction, which is illustrated as comprising an endless chain 10 upon which is mounted a plurality of cup carriers 11, which conform in general contour to the interior shape of the cup. In order to provide for the accommodation of a considerable number of the partly-formed cups in a given space, the chain is arranged to travel in a zig-zag line, as shown in Figs. 1 and 2 over idler sprockets 12 mounted upon shafts $12^a$ which project upwardly from the table or support 1 and keep the chain taut and in proper position. The driving movement is imparted to the chain through a driving sprocket 13 mounted upon a shaft 14 extending through the table support 1. This shaft, in turn, is drivingly connected through gears 15 and 16, idler 17 and pinion gear 18 with the (see Fig. 3) turret gear 19 all arranged beneath the table support 1. The turret gear 19 is mounted upon a shaft 20, which extends through the table support 1, and has fixedly mounted upon the upper extremity thereof the apertured plate member 21 (see Fig. 12), which member, in conjunction with the eccentrically-mounted driving member 22 constitutes the well-known form of intermittent movement of the Geneva type. The driving power necessary to produce this step-by-step movement of the member 21 is transmitted through the intermeshing gears 23, 24 and 25, the intermediate gear 24 being an idler which is mounted upon a shaft $24^a$ supported by the table support 1 (see Fig. 12). The gear 25 is mounted upon the main driving shaft 26, which extends downwardly through the table support 1 and has fixed upon the end thereof a beveled gear 27 (see Fig. 3) which meshes with a beveled gear 28 mounted upon a shaft 29 horizontally supported beneath the table 1. Upon this horizontal shaft 29 is a pulley 30 over which the belt 31 is drivingly mounted, the same being driven by an electric motor 32 through the medium of the pulley 33 mounted upon the motor armature shaft. The energization of the motor is accomplished through the medium of a suitable source of electrical energy indicated at 34, the circuit of which is controlled by the switch 35. In the circuit is located a suitable speed controller or rheostat 36. From this it will be obvious that upon the closing of the motor energizing circuit a step-by-step movement will be imparted to the conveyer mechanism 10 through the several gears and instrumentalities mentioned so that the partly-formed cups positioned upon the carriers 11 will be fed to the paste-applying mechanism and the transfer mechanism in turn, the interval of time between steps being of such duration as will permit the proper functioning of these mechanisms as will now be explained in the order of their operation.

*The paste-applying mechanism.*

The purpose of this mechanism is to apply paste to that circumferential zone upon the inner surface of the cup where the paper disk, which forms the bottom thereof, is to be positioned in order to securely cement and hold the same in place. This operation is accomplished as the cups are being fed to the transfer mechanism in the manner following: Adjacent the conveyer is a standard 37, (see Figs. 7 and 8) mounted upon the table support 1, in which is suitably supported in a reciprocal manner the paste container or reservoir 38, from which paste is automatically fed to a rotatable paste-applying applicator which is brought into coöperation with the cups as they are successively arrested in their movement beneath the same. In order to bring these into coöperation and to apply the paste to that portion where the bottom disk will be fastened in place, it is found preferably to lower the applicator into the open bottom end of the partly-formed cup, and then advance the side wall of the cup toward the applicator while rotating the latter and also the cup. After the paste has been applied the applicator is withdrawn before the partly-formed cup is moved by the next step movement of the carrier toward the transfer mechanism. The reciprocatory movement of the applicator is imparted through the following instrumentalities: A cam shaft 40 (see Figs. 7 and 8) is provided having its upper extremity mounted in bearing 41 of the standard 37 and its lower extremity in a bearing in the table or support 1. The lower end of this cam shaft which projects beneath the table 1 is provided with a beveled gear 42, (see Fig. 3) in mesh with a beveled gear 43 fixedly mounted upon the horizontal driving shaft 29. Mounted upon the cam shaft 40 is a cam having a cam groove 44 in which one end of a rock lever 45, pivoted at 45ª, is operably located. This rock lever, through the pin and slot connection 46, is connected with a sleeve 47 formed integral with the upper portion of the paste reservoir and rotatably mounted upon the shaft 48. Upon the lower end of the shaft 48 is mounted the paste applicator 39. The shaft 48 is reciprocally and rotatably mounted in suitable bearings 49 and 50 provided in the standard 37.

Figure 7:
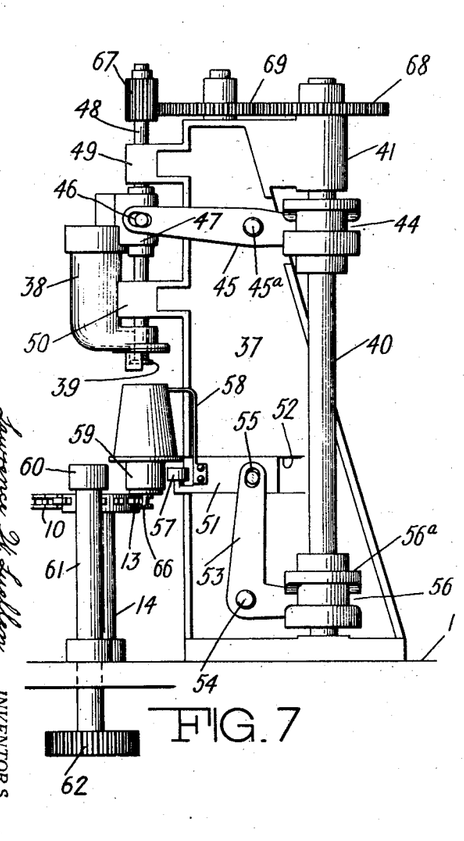
Fig. 7 is a fragmentary vertical sectional view of a portion of the machine taken on line 7—7 of Fig. 2 in one position.
Figure 8:
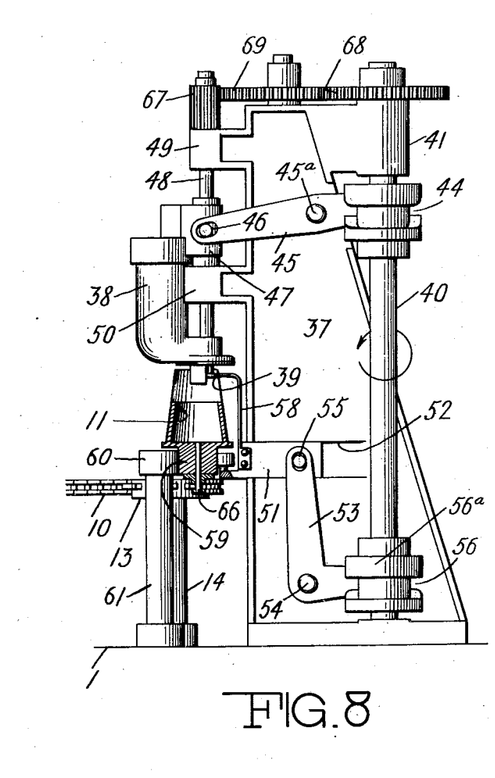
Fig. 8 is a similar view of the same mechanism in a different position.

It will be understood from this that as the cam shaft 40 rotates, the rock lever 45 will, through the cam action described, be caused to first lower the paste-applying mechanism and then raise it in a direction in line with the vertical axis of the partly-formed cup. As in the form of mechanism illustrated, it is necessary to advance the cup toward the applicator or vice versa to apply the paste, this may be accomplished as follows:—

The cup being arrested or brought to a stop for the paste-applying operation, at a point intermediate of the drive sprocket 13 and the following idler sprocket 12ª, and as the conveyer chain is flexible it is possible to deflect the latter so that the cup carrier 11, on which is mounted the partly-formed cup, may be moved outwardly and thus bring the paste applicator and the interior of the cup wall into contact, as shown in Fig. 8. To do this, there is provided a sliding member 51 mounted in and guided by a channel or groove 52 of the standard 37. The reciprocatory movement of this sliding member 51 is accomplished by the bell crank lever 53 pivoted at 54 and having one end connected thereto by the pin and slot connection 55. The opposite end of this bell-crank lever is provided with a stud (not shown) which operates in a cam groove 56 of the cam 56ª mounted upon the cam shaft 40. The slide member 51 carries at its outer end an anti-friction roller 57 and a guide finger 58, the former engaging a cylindrical base 59 of the cup carrier, and the latter the cup near its open bottom end supporting the same at about the zone where the applicator deposits the paste. The bell crank lever is oscillated to move the slide member outwardly until the base 59 of the cup carrier contacts with the friction drive member 60, the latter being mounted upon the shaft 61 and driven by a gear 62 through an idler 63 mounted on the shaft 64 and the gear 65 mounted upon the cam shaft 40. Upon the rotation of the shaft 61 the friction wheel 60 will cause the cup carrier 59 which is rotatably mounted in the conveyer chain by means of the pin 66 to rotate so as to permit the applicator to deposit the paste circumferentially around the inner peripheral wall of the cup, which it will do when the parts are in position shown in Fig. 8, the shaft 48 revolving the applicator 39 to enable it to continuously take up and feed the paste to the surface of the cup. This rotary movement of the shaft 48 is obtained through the reciprocating pinion gear 67 driven by a gear 68 mounted upon the top of the cam shaft 40, through an intermediate gear 69.

It will thus be understood that as the cup is rotated to present new surface to the paste, the applicator is rotating to feed the paste. When this pasting operation is completed, the rotation of the cam shaft 40 simultaneously rocks the levers 45 and 53, the former raising the paste reservoir and applicator, while the latter withdraws the anti-friction roller 57 and the guide finger 58 from the cup and its support. As soon as the paste has been applied, and the applying instrumentalities removed therefrom the Geneva motion mechanism heretofore described again imparts movement to the conveyer so that each succeeding cup may be treated in a similar manner and each cup, when so treated, may be moved step by step toward the transfer mechanism which transfers it to the turret die carrier.

*The transfer mechanism.*

Figure 4:
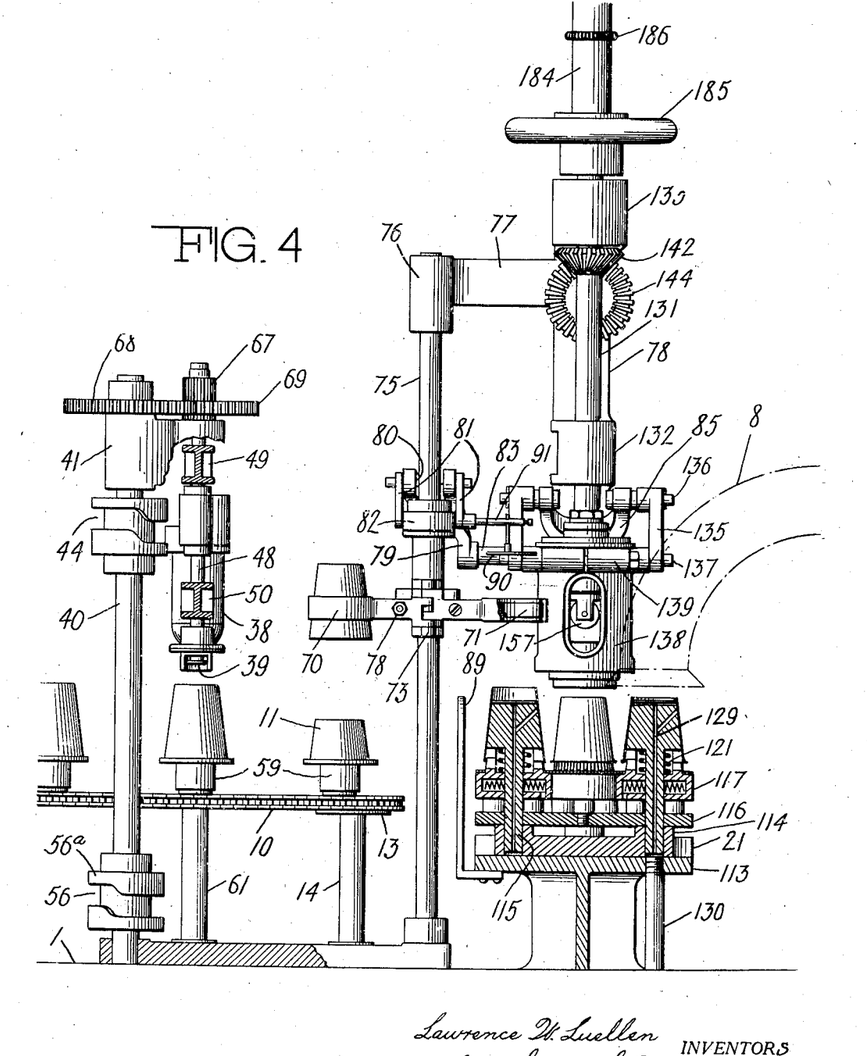
Fig. 4 is a fragmentary vertical sectional view taken on line 4—4 of Fig. 2.
Figures 6, 14:
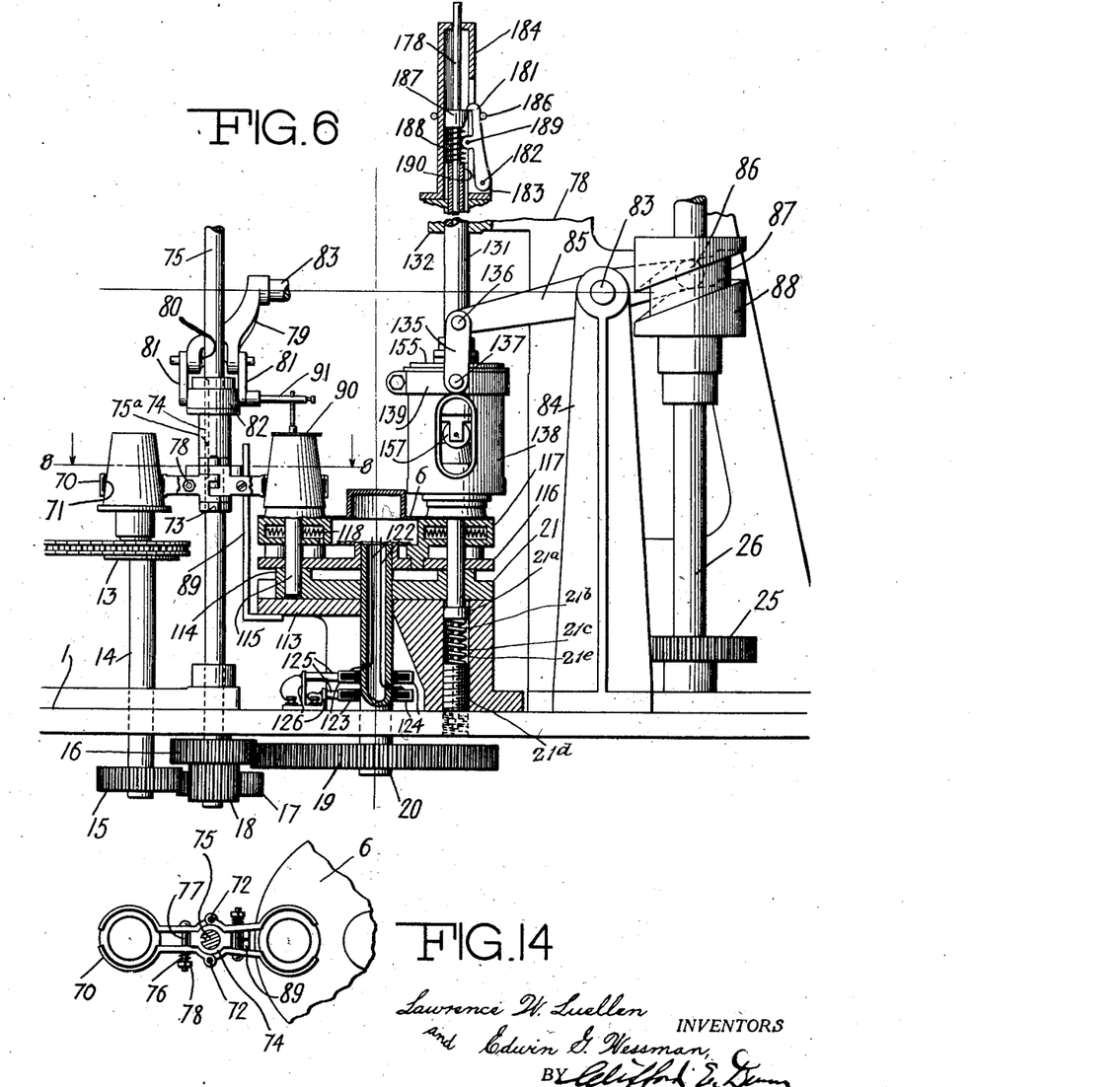
Fig. 6 is fragmentary composite view of portions of the mechanism in Figs. 4 and 5 showing more clearly their relation.
Fig. 14 is a fragmentary top plan view taken on line 8—8 of Fig. 6.

The cup, after leaving the paste-applying mechanism, moves two steps and is brought into the position shown in Fig. 6, and when in this position, one of the twin cup clamps or grippers which are diametrically opposed to each other, and which constitute part of the transfer mechanism, descends into position shown in this figure, encircling and engaging the partly formed cup with sufficient frictional grip to remove it from the carrier 11 into the position shown in Fig. 4, when the transfer mechanism is raised. Both clamps are of like construction and each comprises a pair of semi-circular gripping fingers 70 having contained within recesses formed therein friction material 71 such as cork. These grippers terminate at one end in eyes, mounted upon pins 72 which form bearings therefor. The ends of the pins 72 are mounted in projections or enlargements 73 formed integral with the sleeve 74, which is keyed to the shaft 75 at 75ᵃ so as to rotate therewith and, at the same time, slide thereon. The shaft 75 is driven intermittently through gear 16, which is drivingly connected with the turret gear 19, so that the shaft 75 moving through a half revolution each time conveys a partly-formed cup from the conveyer to a turret die, as will be presently explained. In order to permit the fingers 70 to firmly grasp the partly-formed cup, they are yieldingly held together being urged toward one another by the spring 76 mounted upon one end of the bolt 77 and confined thereon by the nut 78 so that as the grippers descend, they are slightly forced away from one another as they engage a cup upon one of the cup carriers until the cup is firmly seated against the friction material 71. Upon the upward movement of the clamp, the cup will be removed from the cup carrier 11 as will be manifest. The shaft 75 at its upper end is supported by bearing 76, formed at the end of an arm 77 which projects from the main standard 78. The raising and lowering of the transfer mechanism is accomplished by an oscillatory arm 79, the end of which terminates in a fork 80 pivotally connected by means of connecting links 81 to the collar 82 which is fast to the sliding sleeve 74 as shown. The other end of the lever 79 is fixedly mounted upon the end of a shaft 83, which has a bearing in the main standard 78 extending therethrough with its other end bearing in the standard 84 (see Fig. 6). Fixedly mounted to this shaft 83 is a rock arm 85, one end of which is provided with a stud 86 operating in the cam groove 87 of the cam 88, the latter being mounted upon the main driving shaft 26.

It will be understood that, as the shaft 83 rocks, the arm 79 is oscillated so that the cup grippers are raised or lowered as the case may be. When the lever 79 is rocked upwardly the transfer mechanism is raised to the position shown in Fig. 4, the Geneva motion mechanism then imparts through the gears 19 and 16, a half rotation of shaft 75, thus transposing the grippers so that the gripper carrying the partly-formed cup will assume a position directly above one of the turret dies upon which a bottom disk has previously been placed. When the shaft 83 rocks to lower the arm 79, the transfer gripping members are lowered. This carries the partly-formed cup down over the die immediately beneath it, (upon the top of which is the disk which forms the bottom of the cup); while the gripping members 70 are being released from the cup by means of an upwardly-projecting finger 89, having a tapered or spreading end which enters between and separates the gripping members against the tension of the spring 76 in this manner releasing the cup. In order to firmly seat the cup upon the turret die, a plate 90 supported by an arm 91 projecting from the collar 82 engages the bottom of the cup and pushes it firmly into place upon the turret die.

It will be understood that the cup-bottom feeding mechanism is working simultaneously with the transfer mechanism and in step therewith and deposits the cup bottoms on the tops of the turret dies before they are brought into position to receive the partly-formed cups from the transfer mechanism. The mechanism for individually supplying cup bottoms to the turret dies will now be described.

*Cup bottom feeding mechanism.*

Mounted upon a standard or support 92, projecting upwardly from the table support 1 is a tubular magazine 93, which contains a supply of paper disks 94, which form the bottoms of the cups. These paper disks are dispensed or fed from the reservoir at the bottom thereof one at a time, each disk being deposited upon the top of one of the dies carried by the turret as the latter halt in their step-by-step movement in front of the magazine. To accomplish the feeding of the bottom disks, a guide plate 95 (see Fig. 2) is arranged upon the top of the standard 92 and beneath the disk reservoir. This guide plate is provided with a channel 96 extending beneath the lower orifice of the magazine or reservoir 93, the depth and width of the channel being such as to permit the occupation of but one cup bottom at a time. At the extremity of this channel is provided an aperture 97, the dimensions of which will permit the free passage of a bottom disk, so that it may by gravity descend to the top of the turrent die. To successively feed these disks, a push rod 98 having a bottom engaging end or extremity 99 is arranged to slide through the guide plate 95 being guided by an anti-friction roller 100 (see Fig. 5) arranged beneath the adjustable pressure applying mechanism 101. The outer free end of this push rod is formed with an aperture which receives the hook end 102 of the link 103, the latter being connected to the rock arm 104, made fast to the shaft 105, supported in a bearing 106 (see Fig. 2) formed in the upper extremity of the standard or support 107. At the opposite extremity of the shaft 105 and fixedly mounted thereon is a short arm 108, the free end of which is provided with an anti-friction roller 109, which operates in the cam groove of the cam 110 mounted upon the drive shaft 111. This drive shaft extends through the table support 1 and carries at its lower extremity a gear wheel 112, which is driven through gears 63, 65, 42 and 43 from the main horizontal drive shaft 29 beneath the table.

Upon each revolution of the shaft 111, the push rod 98 removes the lowermost disk from the superimposed stack within the magazine 93, pushing it outwardly where it will fall by gravity through the opening 97 to the turret die beneath. The next step of the turret die carries the disk beneath the transfer mechanism, in which position a cup body is deposited thereon in the manner heretofore explained, after which that die moves one step to a position beneath the flange forming head, which operates to form an inwardly and downwardly turned bottom support and an outwardly rolled over edge at the open end of the cup. The turret dies are yieldingly mounted upon the turret table and are suitably heated, so as to facilitate the rolling over of the drinking edge of the cup. The construction and operation of the turret dies will now be explained.

Turret-die.

Figure 5:
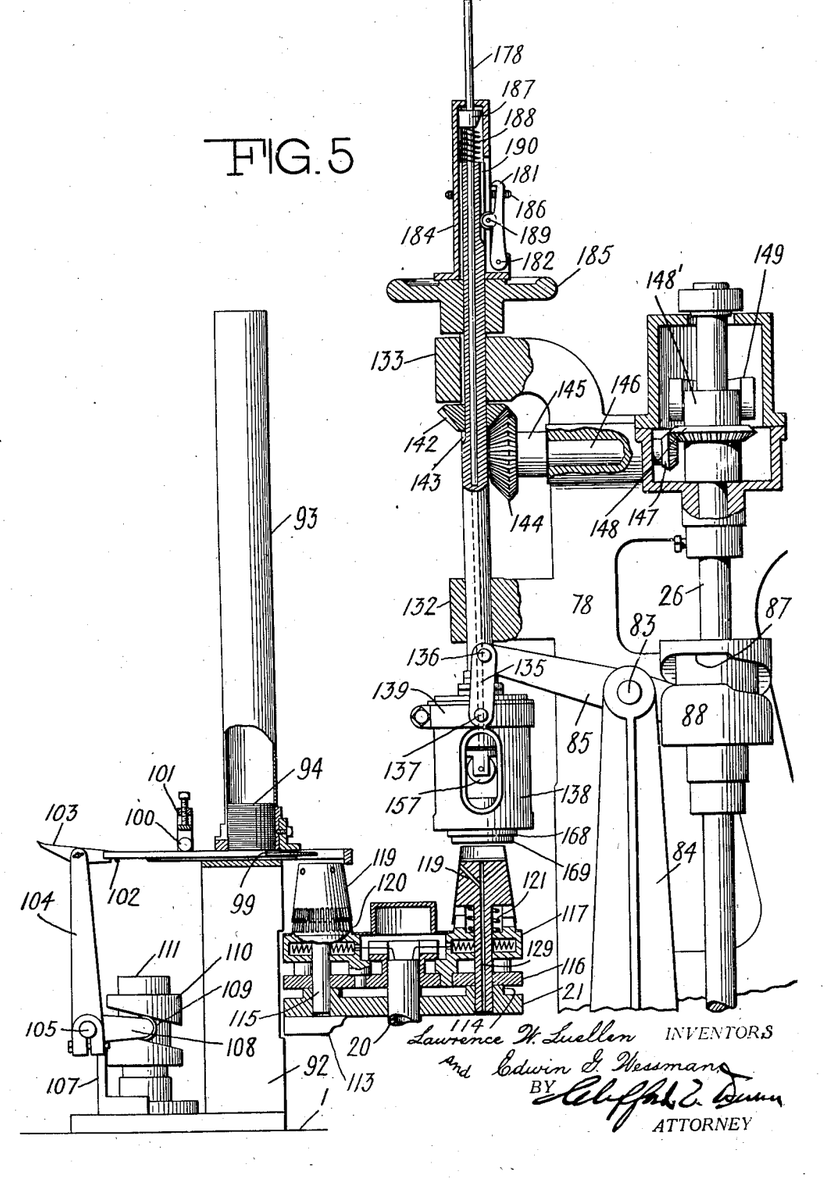
Fig. 5 is a like view taken on line 5—5 of Fig. 2.

The apertured plate member 21 of the Geneva motion mechanism is fixed to the hollow shaft 20 and rotates therewith upon a table or support 113, which is positioned above and fastened to the table support 1. This member 21 is provided with a series of bosses or tubular extensions 114, six in number and corresponding to the number of cup dies carried thereabove. The holes or perforations within these sleeves extend through the member 21 and slidably receive the pins 115, which project from the upper members of the cup dies, each of which are of two-part construction. Resting upon the top of these extensions 114, is a plate member 116, on which are mounted the heating coil housings 117 containing the heating coils 118 (see Fig. 13). Above and formed integral therewith are the lower members of the cup dies. As indicated the dies themselves are of two-part construction, the upper part indicated at 119, is coöperatively associated with the lower part indicated at 120 in dovetail fashion, as shown in Fig. 5, the tongues and grooves of the extremities telescoping so as to provide a yielding connection when the spring 121 is associated therewith, this spring tending to normally project the part 119 upwardly into its extreme upper position. A yielding die of this character serves two purposes,—one is to afford that yieldability desirable when manipulating such material as paper, and the other to provide an automatically adjustable cup-holding die, which will accommodate cups of various sizes. 21$^a$ designates a spring pressed plunger vertically movable in an opening 21$^b$ in the plate member 21 and adapted to yieldingly engage the die pins 115 of the upper die parts when the die is acted upon by the forming head. The plunger 21$^a$ has a rod 21$^c$ slidable in an opening in a plug 21$^d$ adjustably fitted in the lower part of the opening 21$^b$ in the plate 21, a coiled expansion spring 21$^e$ being interposed between said plug and the plunger 21$^a$. The coils 118 maintain the dies at a sufficiently high temperature and these coils are connected with conductors 122, (see Fig. 6), which extend down through the hollow shaft 20 the same being in electrical connection with the brushes 123, which are carried by the shaft 20, but insulated therefrom by suitable insulating material 124. These brushes contact with the spring contacts 125 supported by posts or supports 126, which are electrically connected with the two poles of the source of current 127, which is controlled by a switch 128, shown diagrammatically in Fig. 13. The pins 115 are provided with axially arranged bores or passages 129 extending therethrough which aline during the rotation of the turret with a pipe 130 (after the die has passed beneath the flange-forming head) extending through the support 113, which is connected with a source of compressed air, the admission and passage of which through the port 129 serves to expel the completely-formed cup from the die into the tube 8 (see Fig. 4) which leads to the packing receptacle.

As heretofore explained, the Geneva motion mechanism imparts a step-by-step rotation to the turret die carrier and the die carrier having had deposited thereon a cup bottom and a cup body, moves one step to be acted upon by the flange-forming head, the construction and operation of which is as follows:—

Flange-forming head.

The flange-forming head is mounted upon a rotatable shaft 131, which is reciprocally mounted within bearings in the extending brackets 132 and 133, which are formed integral with the standard or support 78. Reciprocatory movement is imparted to this shaft by means of the rock arm 85, the extremity of which terminates in a yoke 134, operably connected through links 135 and studs 136 and 137 with the flange-forming head. The rock arm 85 is operably connected with the cam shaft 26, as heretofore explained. This mechanism advances the forming head and its contained flange forming instrumentalities into coöperation with the partly-formed cup upon the turret die, and after completing its work, is retracted to permit the turret die to move the completely-formed cup to the point where it is discharged from the machine by compressed air. The flange-forming mechanism is partly mounted within the non-rotating housing 138, which is connected to and carried by a split collar 139, carrying the studs 137 which constitute journals for the links 135. This split collar is in screw-threaded engagement with the housing at 140, which connection provides for adjusting the relative movement of the forming head with respect to the turret dies. The split collar is rigidly held in adjusted position by means of the tightening bolt 141. The mechanism for turning the bottom edge over and inwardly to assist in supporting the bottom of the cup is connected to the shaft 131, which receives its rotation by means of the bevel gear 142, keyed to the shaft at 143 in such a way as to permit the shaft to also reciprocate to advance and retract the flange-forming head. The bevel gear 142 is in mesh with the bevel gear 144 mounted upon the shaft 145, the reduced end 146 of which finds a bearing in the standard 78. The inner end of this reduced shaft 146 is provided with a bevel gear 147, which meshes with the bevel gear wheel 148 mounted upon the upper end of the main cam shaft 26. At the top of the main cam shaft 26 is provided a lever 149, which may be manually operated to disengage the gear 148, carried by a collar 148' slidably mounted upon the shaft 26 from the bevel gear 147 by raising the former from the latter, as it is thought to be clear. The forming-head 138 is connected with the hollow shaft 131 through member 150, which is in screw-threaded engagement with the hollow shaft 131 at 151, the member 150 being revolubly associated with the forming-head 138, through the bearings 152 and 152', which are provided with race-ways formed in the members 153 and 154 fixed to the member 150 and the member 155, which is fixedly held in frictional engagement with the top of the head 138. A lock nut 156 is provided to hold the shaft 131 and the member 150 in proper adjusted position. The mechanism for curling over the bottom side wall of the cup and turning it downwardly to provide a supporting leg for the bottom of the cup, is mounted upon the lower end of the member 150 and comprises a series of beveled rollers or wheels 157 journaled upon shafts 158, which are mounted at one end in extensions 159 of a plate member 160 fast to the member 150 and at the other end in a member 161 which is supported by the member 160 through pins or bolts 162. The wheels 157 are so formed that when brought into engagement with the end of the cup, they will bend or spin the end portion of the paper over inwardly and downwardly into engagement with the bottom of the cup, thus forming a support for the bottom disk and at the same time forming substantially a two-ply wall construction at this portion of the cup as clearly shown in Fig. 15.

Figures 9, 10, 15:
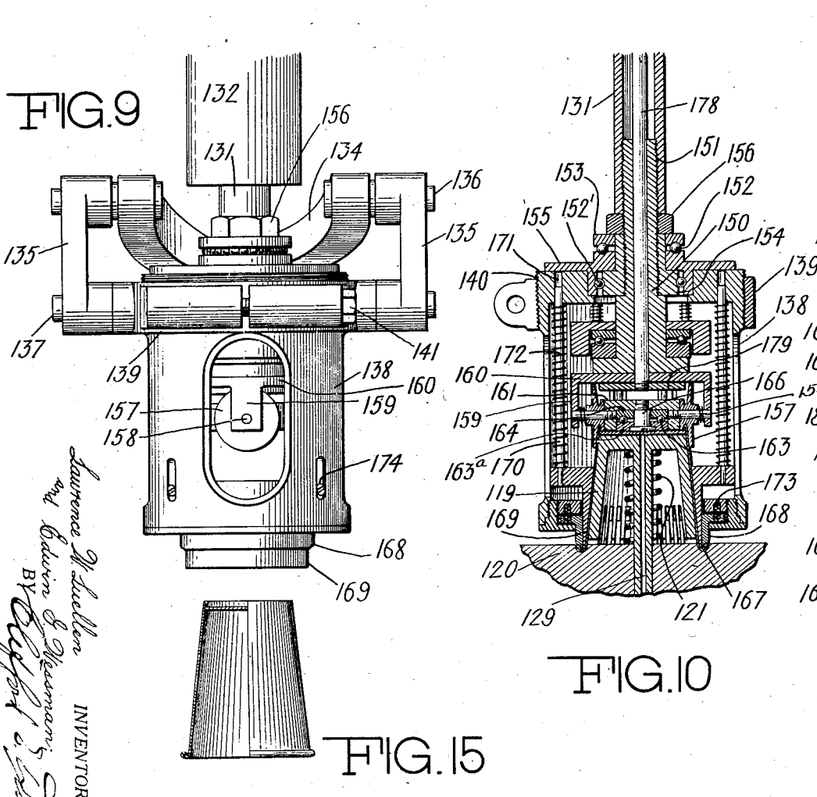
Fig. 9 is an enlarged view in elevation of the flange-forming head.
Fig. 10 is a vertical cross-sectional view thereof showing the relation of the parts before the completion of its operation upon a cup.
Fig. 15 is a view of the finished cup, the product of the machine, the same being shown partly in section and partly in elevation.
Figure 11:
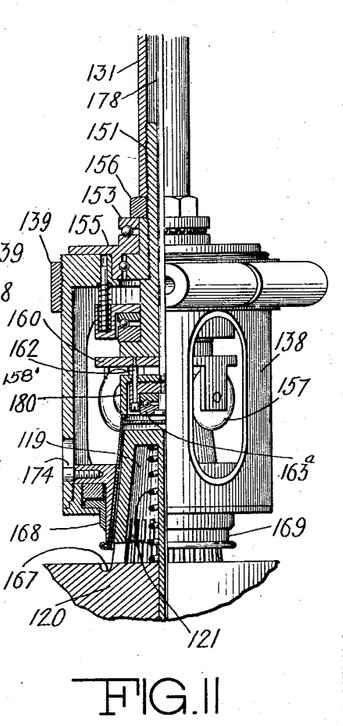
Fig. 11 is a view of the forming head, partly in elevation and partly in section, showing the relation of the parts after the completion of the work upon the cup and after the inauguration of the vertical release movement of the head from the cup-holding die.

It will be understood that the rotation of the shaft 131 will cause a rotation of the roller carrier 160, causing the rollers to travel circumferentially of the cup; at the same time the rollers, being rotatably mounted upon supporting shafts, will, as a consequence, be caused to rotate as well during this forming operation so as to spin the edge of the paper over. During this forming operation, of course, the cup is held stationary upon the turret cup die, and to permit of the rotation of the forming wheels 157 while the cup remains stationary, a bearing connection 163 is provided, the upper member 164 being fixed and carried by the member 161 and rotating therewith, while the lower member 163ª of this bearing is carried by a stud 166 and extends below the extremity of the member 161 a sufficient distance to engage the bottom of the cup which will be held stationary thereby through frictional engagement. Shaft 158, springs 158' thus bear with spring tension upon the wheels 157, so that the latter will yield or give during the spinning operation as they are advanced during the work. This yieldable mounting is desirable owing to the tapering wall of the cup being cut open. Simultaneously with the forming of the bottom supporting leg, a rolled-over edge or flange is formed at the drinking end of the cup, this being accomplished by the coöperation of the annular groove 167 on the lower member of the turret die, and the forming member 168 carried by the forming head at the bottom thereof. These parts are of such form as to cause the drinking end of the cup to be rolled over and then slightly reversed upon itself, as shown in Figs. 10 and 15. In order to position the cup firmly upon the die during the performance of this flange-forming operation, an annular gripper and positioning member 169 is employed, this member being mounted upon the lower extremities of the pins 170, the upper ends of which play in the openings 171 at the upper end of the forming head. Suitable springs 172 are provided for normally urging the annular gripper 169 downwardly so that, as the forming head is brought into engagement with the cup, the gripper ring will firmly seat the cup in advance of the end forming operation. The gripper 169 is allowed a certain independent movement with respect to the head through the pin and slot connection 174 so the cap will be firmly gripped and held in position while the flange-forming member 168 is advanced to its work. It will be understood that as the gripping member 169 moves downwardly with the cup body, the edge of the cup is caused to enter the annular recess in the lower die, where it is rolled over. Further movement of the head causes the forming member 168 to engage the rolled-over edge of the cup and impart to it a further fold or bend. In this manner a smooth, strong and substantial rim at the drinking end of the cup is formed. The lower flange forming member 168 is yieldably mounted through the instrumentality of the springs 173.

After the forming head has completed its work and is being retracted to its upper position by the arm 85 a mechanism is provided for preventing a completed cup from following the head by reason of its frictional engagement with the gripper ring 169 so as to insure the cup remaining upon the cup die to be moved thereby into the discharging position. To provide for this a reciprocating rod 178 is mounted axially of the hollow shaft 131, this rod extending down through the bottom curling roller-carrying plate 160 and has mounted upon its end a plate 179 provided with a series of downwardly extending fingers 180 which are arranged circumferentially in a position to abut the bottom end of the cup. This reciprocating rod 178 is retarded and prevented from immediately moving upwardly, when the forming head begins to rise, so that the fingers 180 will abut the cup and loosen it from the gripper member 169 should it adhere thereto. To retard the movement of this rod and the cup abutting fingers we provide at the upper end of the hollow shaft 131 (see Figs. 5 and 6) latch 181 pivoted at 182 to a support 183, which is a part of a housing 184 mounted above the hand wheel 185 upon the arm or extension 133 (see Fig. 5). This latch 181 is normally urged inwardly by a spring 186 so as to cooperate with a cammed face stop member 187 fixedly mounted upon the rod 178. Interposed between the end of the hollow shaft 131 and the stop 187 is a spring 188 which normally tends to project the latter upwardly as well as the rod 178 fixed thereto. The latch 181 is provided with an anti-friction roller pivoted at 189, which is adapted to ride along the groove 190 in the upper extremity of the shaft 131. When the forming head is in its extreme lower position, the latch 181 is in engagement with the top of the cammed stop 187. As the forming head and shaft 131 move upwardly from the work, the rod 178 is prevented from moving upwardly by the engagement of the latch and cam until the fingers 180 have released the cup from the gripper member 169, permitting the latter to descend and remain upon the turret die. As soon as the anti-friction roll pivoted at 189 is engaged by the upper extremity of the shaft 131 the latch 181 is projected outwardly against the tension of the spring 186, and the cammed stop 187 is projected upwardly under the influence of the spring 188 carrying with it the rod 178 and the cup abutting fingers 180 to their normal retracted position ready for the next descent of the forming head.

Upon the completion of the work upon the cup, the turret die is rotated in its step-by-step movement until the completely formed cup comes beneath the conveyer pipe 8 (see Fig. 4) where under compressed air admitted to the passages 130 and 129 it is expelled from the turret die into the receptacle 9.

The hand wheel 185 permits of the raising or lowering of the forming head by hand for inspection purposes or otherwise.

From the foregoing it will be clear that the various cycles of operation of the several instrumentalities described are so timed that finished cups will be discharged from the turret dies in a continuous manner as they are presented in sequence beneath the tube 8.

While we have illustrated one form of machine embodying the principles of our invention, we do not wish to be limited to structural details described, as these may be altered without departing from the spirit and scope of our invention. We wish to cover the principles of our invention broadly in whatever form they may find embodiment.

Having thus described our invention what we claim and desire to secure by Letters Patent is:

1. In a machine for making paper receptacles, the combination of a turret die carrier, a Geneva motion mechanism for imparting a step-by-step movement thereto, a plurality of dies mounted on said die carrier, said dies being of frusto conical form and two-part construction, means for yieldably supporting the upper parts of said dies with respect to the lower parts and means for heating said dies.

2. In a mechanism of the character described, a turret die carrier, a support therefor, dies thereon provided with annular curved surfaces for forming cup flanges, said dies being of two-part construction, the upper parts being provided with axially arranged depending pins slidably received within the die carrier, and springs surrounding said pins and interposed between the upper die parts and the die carrier for normally urging them into their upper position.

3. In a machine of the character described, the combination of a turret die carrier provided with dies of two-part construction, the upper ends thereof being provided with centering pins slidably arranged within the turret die carrier, springs for normally urging the upper parts of the dies upwardly, heating coils arranged within the carrier beneath the dies, said upper dies and pins being provided with axially arranged apertures and a compressed air supply pipe mounted within the support and in alinement with the axially arranged apertures of the die parts, whereby compressed air will be admitted thereto in a successive manner during the rotation of the die carrier.

4. In a machine of the character described, the combination of a rotating turret die carrier provided with a plurality of cup dies, a hollow shaft connected to said carrier, heating coils arranged beneath said dies, a commutator carried by said hollow shaft and conductors leading from said commutator through said hollow shaft and connecting with said heating coils and means for supplying electrical energy thereto.

5. In a machine of the character described, the combination of a turret die carrier, a plurality of cup dies thereon of two-part construction yieldingly mounted with respect to each other, a forming head reciprocally mounted and coöperatively associated with said dies, means for imparting a step-by-step movement to said die carrier to present the dies successively in position to be acted upon by the forming head and means for reciprocating said forming head each time a die is presented beneath the same.

6. In a mechanism of the character described, a turret die carrier provided with a plurality of cup dies of two-part construction, means for yieldably supporting the upper parts of said dies, depending pins carried by said upper parts and slidably received within the die carrier, a supporting table for said carrier, a shaft connected to said carrier and projecting through said table, gear means at the lower end of said shaft for imparting rotary movement to said carrier, a forming head reciprocally mounted and coöperatively associated with said dies and operating to depress the upper die parts when functioning, a spring-pressed plunger located in said table support and adapted to yieldingly engage the die pins of said upper die parts when the die is acted upon by the forming head.

7. In a machine of the character described, the combination of a cup die of two-part construction, telescopically mounted with respect to each other, yielding means for normally tending to separate them, the lower parts of said dies being provided with annual grooves for receiving the ends of cups, a flange forming head coöperatively associated with said dies and provided with a flange forming ring adapted to coöperate with the annular grooves of the lower die parts for rolling over the edges of the cups.

8. A machine of the character described, a forming head provided with a cylindrical housing, a gripper member having a frusto-conical surface yieldingly mounted within said housing, a flange forming member carried at the lower extremity of said housing and adapted to be advanced by the housing after the gripper member has been arrested in its cup gripping position to permit the flange forming member to operate on the end of a cup.

9. In a machine of the character described, a forming head comprising a cylindrical housing, an annular gripping member provided with a coniform inner peripheral surface, said gripping member being movably mounted relatively to the housing and adapted to firmly seat a cup to be acted upon, a flange forming member carried by the lower extremity of the housing and in sliding engagement with the gripping member and a die provided with an annular groove adapted to coöperate with the flange forming member to form a rolled over edge on the cup acted upon.

10. In a cup making machine, the combination of a cup form, a coöperating forming head adapted to receive the cup form and act upon a cup thereon, a series of rotatably mounted wheel members adapted to turn the cup edge inwardly and downwardly flat upon itself to form a supporting leg for the cup bottom, said wheel members being provided with spaced peripheral flanges having straight inner side faces, and means for revolving the wheel members to act on the cup edge.

11. A machine of the character described, the combination of a cup form adapted to receive and support an inverted partly-formed cup, a forming head adapted to coöperate with the form to complete the cup, said forming head comprising an inclosing housing, a gripper member yieldingly mounted within the housing and adapted to engage and firmly seat a cup body against the cup form, a flange forming member carried at the lower extremity of said housing adapted to engage the end of the cup to form a rolled-over edge thereat, edge spinning mechanism mounted within the housing and adapted to engage the bottom edge of the cup and direct the same inwardly to support the cup bottom, said edge spinning mechanism comprising a plurality of rotatably mounted grooved wheels journaled at right angles to the axis of the housing, a frame for supporting said journaled wheels and means for rotating the frame, so as to spin the grooved wheels circumferentially of the cup being acted upon.

12. A machine of the character described, the combination of a cup form adapted to receive and support an inverted partly formed cup, a forming head adapted to coöperate with the form to complete the cup, said forming head comprising an inclosing housing, a gripper member yieldingly mounted within the housing and adapted to engage and firmly seat a cup body against the cup form, a flange forming member carried at the lower extremity of said housing adapted to engage the end of the cup to form a rolled-over edge thereat, edge spinning mechanism mounted within the housing and adapted to engage the bottom edge of the cup and direct the same inwardly to support the cup bottom, said edge spinning mechanism comprising a plurality of rotatably mounted grooved wheels journaled at right angles to the axis of the housing, a frame for supporting said journaled wheels, means for rotating the frame so as to spin the grooved wheels circumferentially of the cup being acted upon, and means for temporarily engaging the spun-over edge of the cup when the flange wheels are removed therefrom.

13. In a cup machine, the combination of a cup die adapted to receive a partly-formed cup thereon, a forming head reciprocally mounted with respect thereto, said forming head being provided with a flange forming member at its lower extremity, and a gripping member adapted to engage a cup body to seat it firmly upon the cup die, mechanism for spinning over the lower edge of the cup into engagement with the bottom thereof, means for rotating the edge spinning mechanism with respect to the head, means for engaging the bottom edge of the cup to positively release the cup from the gripping member and the edge spinning mechanism when the head is separated from the die.

14. In a machine of the character described, the combination of a cup die of two-part construction, one of which is yieldingly mounted with respect to the other and the other of which dies is provided with an annular groove, a forming head associated with said die provided with a yielding gripping member adapted to engage a cup upon the die, an annular flange forming member adapted to coöperate with the annular groove of the die to roll over the edge of the cup being acted upon, means carried by the head and rotatable with respect thereto for engaging and turning over the lower edge of the cup to form a supporting leg for the bottom thereof, said latter means comprising a plurality of grooved wheels, a frame carrying said wheels, means for engaging the bottom of the cup to prevent its removal from the cup die upon the withdrawal of the head, said last-mentioned means comprising a plate provided with a plurality of fingers, a rod connected with said plate and arranged axially of the head and latch mechanism coöperating with said rod to retain it in its lowermost position until the head has moved vertically a sufficient distance to free the grooved wheels and the gripping member from the cup being acted upon.

15. A machine of the character described, a forming head comprising a housing, a flange forming member carried at the lower extremity thereof, means within said housing for turning over the bottom edge of the cup to form a cup bottom supporting leg, means for rotating said turning over means within the housing and means for reciprocating the same.

16. In a machine of the character described, the combination of a cup form adapted to receive and support an inverted partly-formed cup, forming means adapted to coöperate with the form to complete the cup, said means including a reciprocally mounted carrier frame, a series of grooved wheels rotatably mounted on the carrier frame adapted to engage the bottom edge of the cup and direct the same inwardly to support the cup bottom, said carrier frame having a bearing arranged centrally of the series of grooved wheels and adapted to engage the bottom of the cup on the form, the carrier frame being capable of rotation independently of said bearing, and means for rotating the carrier frame to spin the grooved wheels circumferentially of the cup being acted upon.

17. In a machine of the character described, the combination of a cup form adapted to receive and support an inverted partly-formed cup, a reciprocally mounted forming head adapted to coöperate with the form to complete the cup, said forming head comprising an inclosing housing, an annular gripper member yieldably mounted within the housing and adapted to engage and firmly seat a cup body against the cup form, edge spinning mechanism mounted within the housing, said edge spinning mechanism including a carrier frame, a series of grooved wheels rotatably mounted on the carrier frame adapted to engage the bottom edge of the cup and direct the same inwardly to support the cup bottom, said carrier frame having a bearing arranged centrally of the series of grooved wheels and adapted to engage the bottom of the cup on the form, the carrier frame being capable of rotation independently of said bearing, and means for rotating the carrier frame to spin the grooved wheels circumferentially of the cup being acted upon.

18. In a machine of the character described, the combination of a cup form adapted to receive and support an inverted partly-formed cup, a reciprocally mounted forming head adapted to coöperate with the form to complete the cup, said forming head comprising an inclosing housing, an annular gripper member yieldably mounted within the housing and adapted to engage and firmly seat a cup body against the cup form, edge spinning mechanism mounted within the housing, said edge mechanism including a carrier frame, a series of grooved wheels rotatably mounted on the carrier frame adapted to engage the bottom edge of the cup and direct the same inwardly to support the cup bottom, said carrier frame having a bearing arranged centrally of the series of grooved wheels and adapted to engage the bottom of the cup on the form, the carrier frame being capable of rotation independently of said bearing, means for rotating the carrier frame to spin the grooved wheels circumferentially of the cup being acted upon, and means located between the annular gripper member and said carrier frame bearing for engaging the bottom of the cup to positively release the cup from the gripper member and the edge spinning mechanism when the forming head is separated from the form.

19. In a machine of the character described, the combination of a turret die carrier provided with a plurality of cup dies of two-part construction telescopically mounted with respect to each other, yielding means for normally tending to separate them, the lower parts of said dies being provided with annular curved surfaces for forming cup flanges, and a forming head coöperatively associated with said dies.

20. In a machine of the character described, the combination of a turret die carrier provided with a plurality of cup dies of two-part construction telescopically mounted with respect to each other, yieldable means for normally tending to separate them, and a forming head coöperatively associated with said dies and having an annular gripper member yieldably mounted on the head, said gripper member being adapted to engage and firmly seat a cup body against the cup dies.

21. In a machine of the character described, the combination of a turret die carrier provided with a plurality of cup dies of two-part construction telescopically mounted with respect to each other, yieldable means for normally tending to separate them, a forming head coöperatively associated with said dies, a gripper member yieldably mounted upon said forming head, the gripper member being adapted to engage and firmly seat a cup body against the cup dies, and edge spinning mechanism mounted upon the forming head and adapted to engage the bottom edge of the cup and direct the same inwardly to support the cup bottom.

22. In a machine of the character described, the combination of a turret die carrier provided with a plurality of cup dies of two-part construction telescopically mounted with respect to each other, yieldable means for normally tending to separate them, a forming head coöperatively associated with said dies, and edge spinning mechanism mounted upon the forming head and adapted to engage the bottom edge of the cup and direct the same inwardly to support the cup bottom.

23. In a machine of the character described, the combination of a cup die, a reciprocally mounted forming head arranged to coöperate with said die provided with a yielding gripper member adapted to engage a cup upon the die, rotatable means carried by the head for engaging and turning over the lower edge of the cup to form a supporting leg for the bottom thereof, means for preventing the removal of the cup from the cup die upon withdrawal of the forming head, said last mentioned means including a part to engage the bottom of the cup, a rod connected with said part and arranged axially of the head, and latch mechanism coöperating with said rod to retain it in its lowermost position until the head has moved vertically a sufficient distance to free the supporting leg forming means and the gripper member from the cup being acted upon.

24. In a machine of the character described, the combination of a turret die carrier provided with a plurality of cup dies of two-part construction telescopically mounted with respect to each other, yieldable means for normally tending to separate them, and forming means coöperatively associated with said dies and including a rotatably mounted carrier, a series of grooved wheels rotatably mounted on the carrier and adapted to engage and turn over the edge of the cup, and means for rotating the carrier to spin the grooved wheels circumferentially of the cup being acted upon.

LAWRENCE W. LUELLEN.
EDWIN G. WESSMAN.